US010577023B2

(12) United States Patent
Stojkovic et al.

(10) Patent No.: US 10,577,023 B2
(45) Date of Patent: Mar. 3, 2020

(54) ROOF FRAME BRACKET ASSEMBLY

(71) Applicant: Ford Global Technologies, LLC, Dearborn, MI (US)

(72) Inventors: Dragan B. Stojkovic, Taylor, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 128 days.

(21) Appl. No.: 15/976,488

(22) Filed: May 10, 2018

(65) Prior Publication Data
US 2019/0344832 A1    Nov. 14, 2019

(51) Int. Cl.
*B62D 27/06*    (2006.01)
*B62D 25/04*    (2006.01)
*B62D 25/06*    (2006.01)
*B62D 27/02*    (2006.01)

(52) U.S. Cl.
CPC ............ *B62D 25/06* (2013.01); *B62D 25/04* (2013.01); *B62D 27/02* (2013.01); *B62D 27/023* (2013.01)

(58) Field of Classification Search
CPC ........ B62D 25/04; B62D 25/06; B62D 27/02; B62D 27/023
USPC ................................ 296/193.06, 203.03, 205
See application file for complete search history.

(56) References Cited

U.S. PATENT DOCUMENTS

| 6,217,109 | B1 | 4/2001 | Okana et al. | |
| 6,789,840 | B2 * | 9/2004 | Honma | B62D 25/06 |
| | | | | 296/187.12 |
| 7,431,378 | B2 | 10/2008 | Chen et al. | |
| 7,914,068 | B2 | 3/2011 | Mizohata | |
| 8,109,561 | B2 | 2/2012 | Matsumura | |
| 8,960,775 | B2 | 2/2015 | Nagai et al. | |
| 9,969,434 | B2 * | 5/2018 | Baccouche | B62D 27/023 |
| 10,150,517 | B2 * | 12/2018 | Stojkovic | B62D 25/04 |
| 2010/0244497 | A1 * | 9/2010 | Honda | B62D 21/02 |
| | | | | 296/205 |
| 2011/0156445 | A1 * | 6/2011 | Labbe | B62D 25/04 |
| | | | | 296/193.06 |

FOREIGN PATENT DOCUMENTS

CN    201457477 U    5/2010

OTHER PUBLICATIONS

Per Schroeder, "Bar Hopping: Top Tips for Your Next Roll Cage" dated Jun. 11, 2012 from Grass Roots Motor Sports Downloaded from Internet URL: https://grassrootsmotorsports.com/articles/bar-hopping-top-tips-for-your-next-roll-cage (3 pages).

* cited by examiner

*Primary Examiner* — Jason S Daniels
(74) *Attorney, Agent, or Firm* — Vichit Chea; Bejin Bieneman PLC

(57) ABSTRACT

A roof frame includes a roof rail having a bottom, a bracket assembly, and a pillar. The bracket assembly includes a bracket inner and a bracket outer fixed to each other. The bracket inner and the bracket outer fixed to the bottom of the roof rail. The pillar includes a pillar inner fixed to the bracket inner and a pillar outer fixed to the bracket outer. The pillar inner and the pillar outer fixed to each other.

20 Claims, 5 Drawing Sheets

ROOF FRAME BRACKET ASSEMBLY

BACKGROUND

A vehicle a roof assembly may have a roof frame and one or more roof panels supported by the roof frame. The one or more roof panels may be releasably connected from the roof frame. When the one or more roof panels are connected to the roof frame, the one or more roof panels covers the roof frame of the vehicle, i.e., shields the roof frame from the environment. When the one or more roof panels are released from the roof frame, the roof frame is exposed to the environment, e.g., wind, water, debris, etc.

DETAILED DESCRIPTION

Figure 1A:
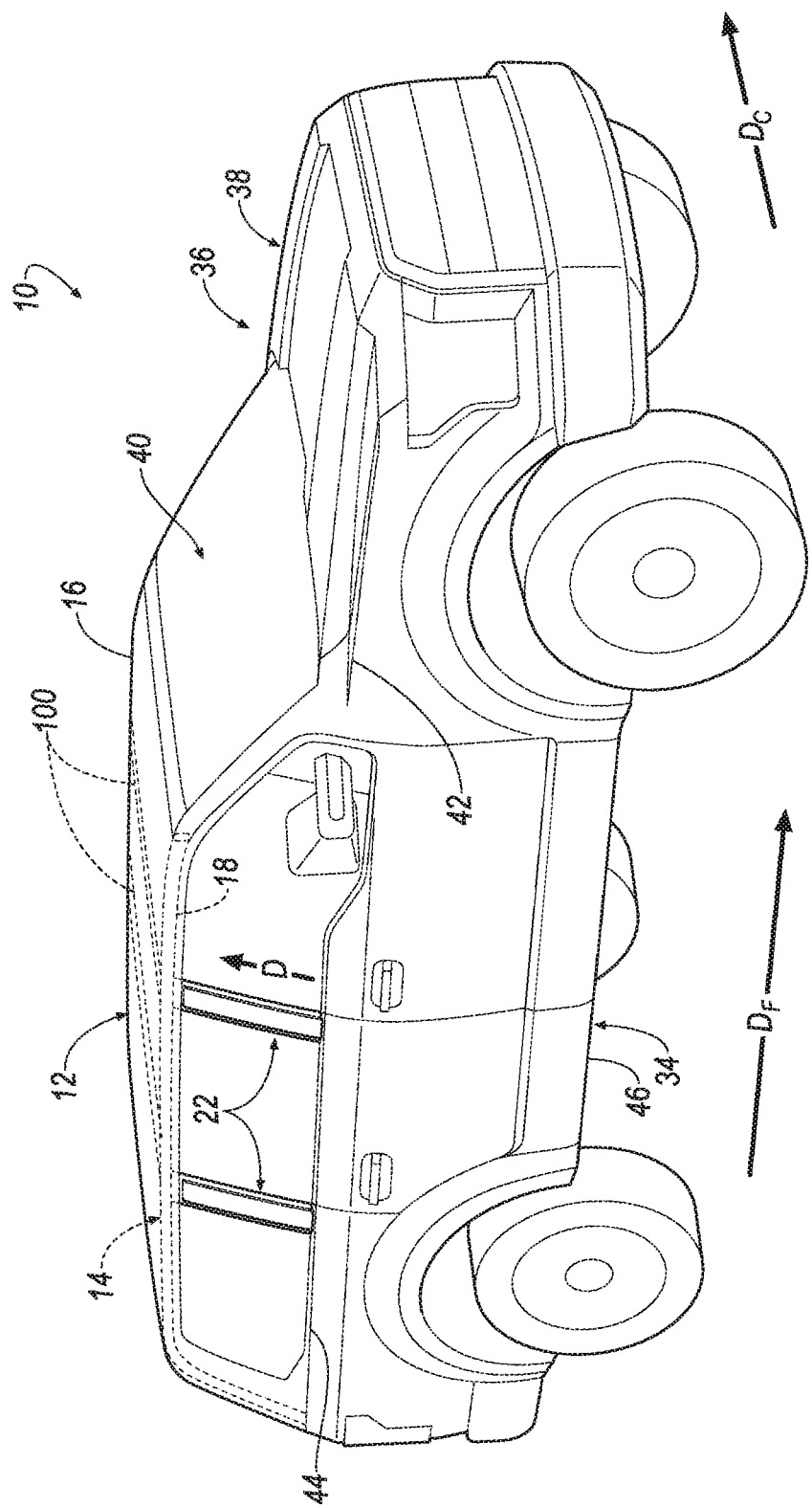
FIG. 1A is perspective view of a vehicle including a roof frame and an exterior panel covering the roof frame.

A roof frame includes a roof rail having a bottom. A bracket assembly includes a bracket inner and a bracket outer fixed to each other. The bracket inner and the bracket outer are fixed to the bottom of the roof rail. A pillar includes a pillar inner fixed to the bracket inner as a pillar outer fixed to the bracket outer. The pillar inner and the pillar outer are fixed to each other.

The bracket outer may include a surface extending in a vehicle fore-and-aft direction, the surface being fixed to the bottom of the roof rail.

The roof rail may include an inner side and an outer side spaced from each other in a cross-vehicle direction. The inner side and the outer side extending from the bottom in a direction transverse to the cross-vehicle direction.

The bracket inner may include a flange extending in the direction along the inner side of the roof rail. The flange may be fixed to the inner side of the roof rail.

The bracket inner may include wings spaced from each other in a vehicle fore-and-aft direction. The wings may be fixed to the bottom of the roof rail.

The bracket outer may include a surface extending in the vehicle fore-and-aft direction from one wing to the other wing. The surface and the wings may extend in a plane along the bottom of the roof rail.

The bracket inner may include the flange elongated in the vehicle fore-and-aft direction, the surface includes an inner edge abutting the flange from one wing to the other wing.

The surface may include an outer edge spaced from the inner edge in a cross-vehicle direction. A seal may be sandwiched between the outer edge of the surface and the bottom of the roof rail. The seal may extend from one wing to the other wing.

The bracket assembly may include a seal sandwiched between the bracket inner and the bracket outer.

The bracket inner may include sealing surfaces spaced from each other in a vehicle fore-and-aft direction. Each sealing surface may include a top surface extending in a cross-vehicle direction and a front surface extending in a direction transverse to the cross-vehicle direction.

The bracket outer may include an inner surface abutting the sealing surfaces. The inner surface may extend along each sealing surface from the top surface to the front surface.

The seal may be disposed along each sealing surface from the top surface to the front surface.

Each sealing surface may include a transition surface extending from the top surface to the front surface. The seal may be disposed along the transition surface.

The pillar inner may include walls spaced from each other in a vehicle fore-and-aft direction and a back extending from one wall to the other wall. The walls and the back may define a channel and the bracket inner disposed in the channel.

The bracket inner may abut the walls and the back of the pillar inner. The bracket inner may be fixed to the pillar inner in the channel.

The pillar inner may include a weld flange extending from each wall away from the channel in the vehicle fore-and-aft direction, and the pillar outer may include mounting flanges spaced from each other in the vehicle fore-and-aft direction. The mounting flanges of the pillar outer may abut the weld flanges of the pillar inner, respectively.

A seal may be sandwiched between the mounting flanges of the pillar outer and the weld flanges of the pillar inner.

The pillar may include a body side panel encompassing the pillar outer. The mounting flanges of the pillar outer may be sandwiched between the body side panel and the weld flanges of the pillar inner.

The pillar may include a body side panel encompassing the pillar outer and the bracket outer. The body side panel may be fixed to the pillar outer and the bracket outer.

The body side panel may be fixed to the pillar inner.

With reference to the Figures, wherein like numerals indicate like parts throughout the several views, a vehicle 10 is generally shown. The vehicle 10 includes a roof assembly 12 having a roof frame 14 and at least one exterior panel 16 releasably connectable with the roof frame 14. The at least one exterior panel 16 may be releasable from a covered position, shown in FIG. 1A, to an uncovered position. When the at least one exterior panel 16 is in the uncovered position, the roof frame 14 is exposed to the environment, e.g., water, debris, etc., as shown in FIG. 1B. The roof frame 14 is assembled to prevent intrusion, e.g., by water, debris, etc., into the roof frame 14 when the at least one exterior panel 16 is in the uncovered position, which may prevent or reduce corrosion of the roof frame 14 and other vehicle components, e.g., rockers.

The roof frame 14 includes a roof rail 18, a bracket assembly 20, and a pillar 22. The roof rail 18 includes a bottom 24. The bracket assembly 20 includes a bracket inner 26 and a bracket outer 28 fixed to each other. The bracket inner 26 and the bracket outer 28 are fixed to the bottom 24 of the roof rail 18. The pillar 22 includes a pillar inner 30 fixed to the bracket inner 26 and a pillar outer 32 fixed to the bracket outer 28. The pillar inner 30 and the pillar outer 32 are fixed to each other. The bracket assembly 20 is designed to conform to the shape of the roof rail 18. In other words, the curvature of the bracket assembly 20 matches the curvature of the roof rail 18. Since the curvature of the bracket assembly 20 matches the curvature of the roof rail 18, the bracket assembly 20 reduces the size and/or number of intrusion points, e.g., for water, debris, etc., into the roof frame 14. By reducing the size or number of intrusion points, e.g., for water, debris, etc., into the roof frame 14, the bracket assembly 20 may prevent or reduce corrosion of the pillar 22.

The vehicle 10 may, for example, be any suitable type of automobile. The vehicle 10 may include two sides 34, 36 spaced from each other in a cross-vehicle direction Dc. The two sides 34, 36 of the vehicle 10 may extend transverse to the cross-vehicle direction Dc. For example, the two sides 34, 36 may each be elongated in a vehicle fore-and-aft direction Df. Each side of the vehicle 10 may be similar or identical to each other. Common numerals are used to identify common features on each side of the vehicle 10. The two sides 34, 36 of the vehicle 10 may be mirror images of each other about the vehicle fore-and-aft direction Df.

Figure 1B:
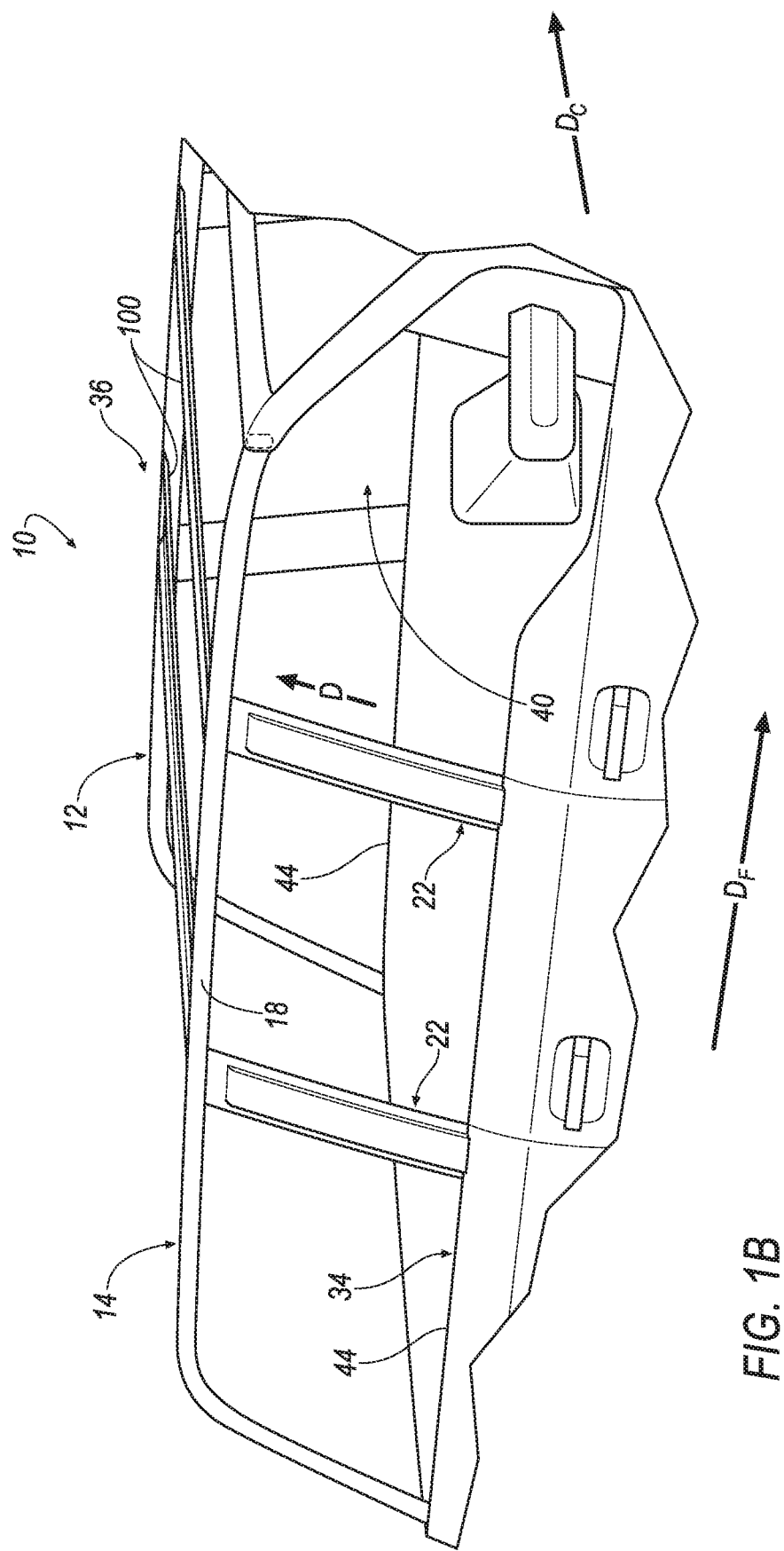
FIG. 1B is a magnified view of a portion of the vehicle with the exterior panel removed and the roof frame exposed to the environment

With reference to FIG. 1A, the vehicle 10 may include a vehicle body 38 defining a passenger cabin 40 to house occupants, if any, of the vehicle 10. The passenger cabin 40 includes front seats (not shown) disposed at a front (not numbered) of the passenger cabin 40 and rear seats (not shown) spaced from the front seats. The rear seats may be, for example, disposed behind the front seats in the passenger cabin 40, e.g., at a rear (not numbered) of the passenger cabin 40. The passenger cabin 40 may also include third-row seats (not shown) at the rear of the passenger cabin 40, in which case the front seats may be second-row seats (not numbered) instead of or in addition to being front seats. The front seats and the rear seats may be a same or different type of seat. The front seats and rear seats may be any suitable type of seats. The front seats and the rear seats may be, for example, a bucket seat.

With continued reference to FIG. 1A, the vehicle body 38 may include a front fender 42 and a rear fender 44 spaced from the front fender 42 in the vehicle fore-and-aft direction Df. Specifically, the body may include one front fender 42 and one rear fender 44 on each side of the vehicle 10. In other words, the body may include on front fender 42 and one rear fender 44 on one side 34 of the vehicle 10 and another front fender 42 and another rear fender 44 on the other side 36 of the vehicle 10. The front fenders 42 are spaced from each other in the cross-vehicle direction Dc, and the rear fenders 44 are spaced from each other in the cross-vehicle direction Dc.

With continued reference to FIG. 1A, the vehicle body 38 may include a floor 46 and the roof assembly 12 spaced from the floor 46. The roof assembly 12 may include the roof frame 14 and the at least one exterior panel 16 releasably connected to the roof frame 14, as set forth above. The floor 46 may include rockers (not numbered) extending along each side of the vehicle 10. For example, the rockers may extend in the vehicle fore-and-aft direction Df. The rockers may be formed of any suitable material, e.g., steel, boron, etc.

With continued reference to FIG. 1A, the roof frame 14 may extend in the vehicle fore-and-aft direction Df from the front fender 42 to the rear fender 44 of the vehicle 10. Additionally, the roof frame 14 may extend in the cross-vehicle direction Dc from one side 34 to the other side 36 of the vehicle 10. In other words, the roof frame 14 may extend to each of the fenders.

Figure 2:
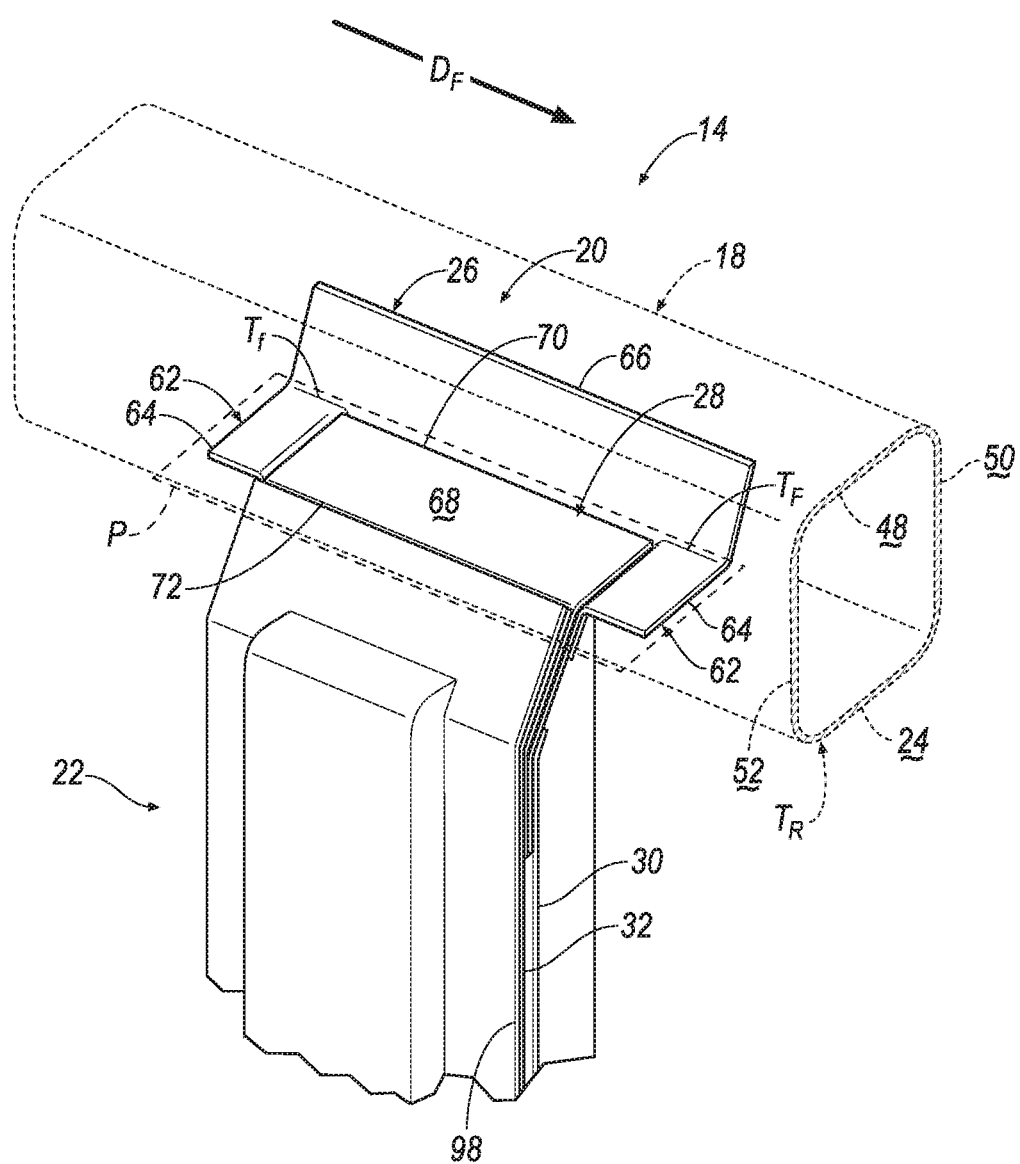
FIG. 2 is magnified view of a portion of the roof frame including a roof rail and a bracket assembly and a pillar fixed to the roof rail.

With continued reference to FIG. 2, the roof frame 14 may include roof rails 18 spaced from each other in the cross-vehicle direction Dc. For example, the roof frame 14 may include one roof rail 18 on one side 34 of the vehicle 10 and another roof rail 18 on the other side 36 of the vehicle 10. The roof rail 18 may be elongated in the vehicle fore-and-aft direction Df. For example, the roof rail 18 may extend from the front fender 42 to the rear fender 44 of the vehicle 10. The roof rail 18 may be formed of any suitable material, e.g., mild steel.

With reference to FIG. 2, the roof rail 18 may include a top 48 spaced from the bottom 24 in a direction D transverse, e.g., perpendicular, to the vehicle fore-and-aft direction Df and the cross-vehicle direction Dc. The top 48 is above the bottom 24. The direction D, for example, may be vertical. The top 48 may abut the exterior panel 16 when the exterior panel 16 is in the covered position. In other words, the top 48 is disposed between the exterior panel 16 and the bottom 24 when the exterior panel 16 is in the covered position. The bottom 24 faces the floor 46. In other words, the bottom 24 is disposed between the top 48 and the floor 46 of the vehicle 10.

Figure 3:
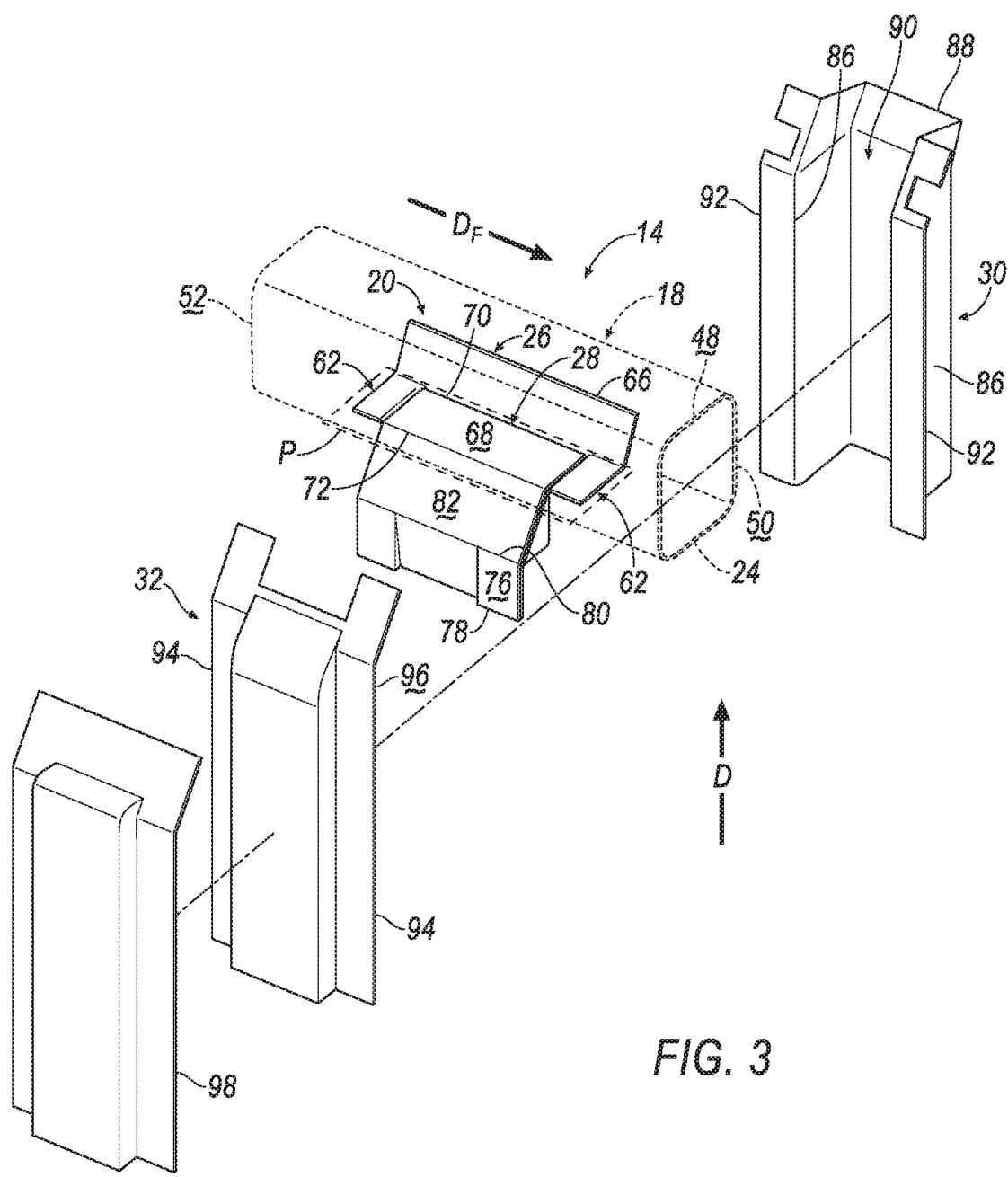
FIG. 3 is an exploded view of the bracket assembly and the pillar of FIG. 2.

With reference to FIG. 3, the roof rail 18 may include an inner side 50 and an outer side 52 spaced from the inner side 50 in the cross-vehicle direction Dc. The inner side 50 and the outer side 52 extend from the bottom 24 in a direction transverse, e.g., perpendicular, to the cross-vehicle direction Dc. The inner side 50 and the outer side 52 may extend in the direction D from the bottom 24 to the top 48 of the roof rail 18. The roof rail 18, i.e., the bottom 24, the top 48, the inner side 50, and the outer side 52, may be rectangular, e.g., square, in cross-section.

The inner side 50 may face the passenger cabin 40, and the outer side 52 may face away from the passenger cabin 40, i.e., the exterior environment. The roof rail 18 may include a transition Tr from the bottom 24 to each of the inner side 50 and the outer side 52, and from the top 48 to each of the inner side 50 and the outer side 52. The transition Tr may be rounded. In other words, the roof rail 18 may have a generally rounded shape, e.g., e.g., circular, elliptical, rounded rectangle, rounded square, rounded polygon, etc.

With reference to FIGS. 1A & 1B, the roof frame 14 may include any suitable number of pillars 22 on each side of the vehicle 10. The pillars 22 may be disposed between the front fender 42 and the rear fender 44 of the vehicle 10. The pillars 22 may be spaced from each other in the vehicle fore-and-aft direction Df. The pillars 22 may extend downwardly from the bottom 24 of the roof rail 18 towards the floor 46.

With reference to FIG. 3, the pillar 22 is fixed to the roof rail 18 by the bracket assembly 20. Specifically, the pillar 22 is fixed to the bracket assembly 20 and the bracket assembly 20 is fixed to the roof rail 18. The pillar 22 may be fixed to the bracket assembly 20 in a same or different manner as the bracket assembly 20 is fixed to the roof rail 18. For example, the pillar 22, bracket assembly 20, and roof rail 18 may be welded together (e.g., metal inert gas (MIG) welding, tungsten inert gas (TIG) welding, or any other suitable welding manner), and/or adhered together, etc.

Figure 4A:
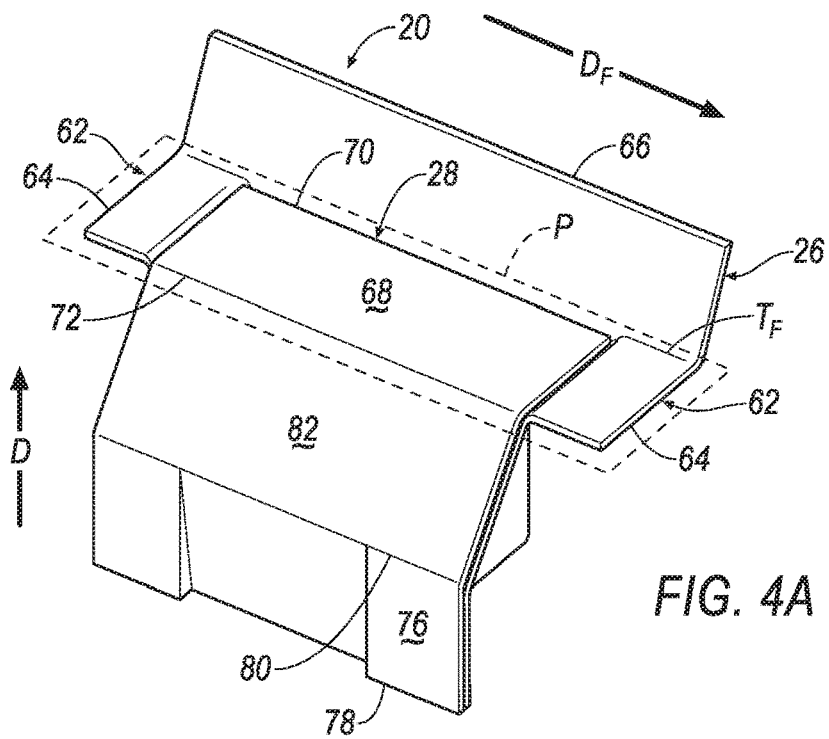
FIG. 4A is a perspective view of the bracket assembly including a bracket outer fixed to a bracket inner.

With reference to FIG. 4A, the bracket inner 26 may include sealing surfaces 54 spaced from each other in the vehicle fore-and-aft direction Df. The sealing surfaces 54 may include a top surface 56 extending in the cross-vehicle direction Dc and a front surface 58 extending in the direction D. The top surfaces 56 and the front surface 58 may be spaced from each other. In this situation, the bracket inner 26 may include a transition surface 60 extending from the top surfaces 56 to the front surface 58. The transition surface 60 may extend transverse, e.g., at a non-right angle, to both the direction D and the cross-vehicle direction Dc. Alternatively, the front surface 58 and the top surfaces 56 may intersect each other. In other words, the front surface 58 may extend downwardly from the top surfaces 56, and the top surfaces 56 may extend laterally from the front surface 58.

The bracket inner 26 may include wings 62 extending from the top surfaces 56s, respectively, to ends 64 spaced from each other in the vehicle fore-and-aft direction Df, as shown in FIG. 4A. In other words, the wings 62 are spaced from each other in the vehicle fore-and-aft direction Df. The wings 62 may extend from the top surfaces 56 away from each other. In other words, one wing 62 may extend toward the front of the passenger cabin 40 and the other wing 62 may extend toward the rear of the passenger cabin 40. The wings 62 may abut the bottom 24 of the roof rail 18, as shown in FIG. 2. Specifically, the wings 62 may be fixed, e.g., welded and/or adhered, etc., to the bottom 24 of the roof rail 18. The bracket inner 26 may be formed of any suitable material, e.g., mild steel, boron, etc.

The bracket inner 26 may include a flange 66 extending in the direction D, as shown in FIG. 4A. The flange 66 may extend in the vehicle fore-and-aft direction Df from the end 64 of one wing 62 to the end 64 of the other wing 62. The flange 66 may be disposed adjacent to the inner side 50 of the roof rail 18, as shown in FIG. 2. For example, the flange 66 may extend upwardly along the inner side 50 of the roof rail 18. The flange 66 may extend any suitable amount along the inner side 50 of the roof rail 18. The flange 66 may be fixed, e.g., welded and/or adhered, etc., to the inner side 50 of the roof rail 18.

The bracket inner 26 may include a transition Tf from the flange 66 to each of the wings 62. The transition Tf may be rounded. Specifically, the transition Tf between the wings 62 and the flange 66 may match, i.e., have the same curvature as, the transition Tr between the bottom 24 and the inner side 50 of the roof rail 18. In other words, the transition Tf between the wings 62 and the flange 66 may abut the transition Tr between the bottom 24 and the inner side 50 of the roof rail 18.

Figure 4B:
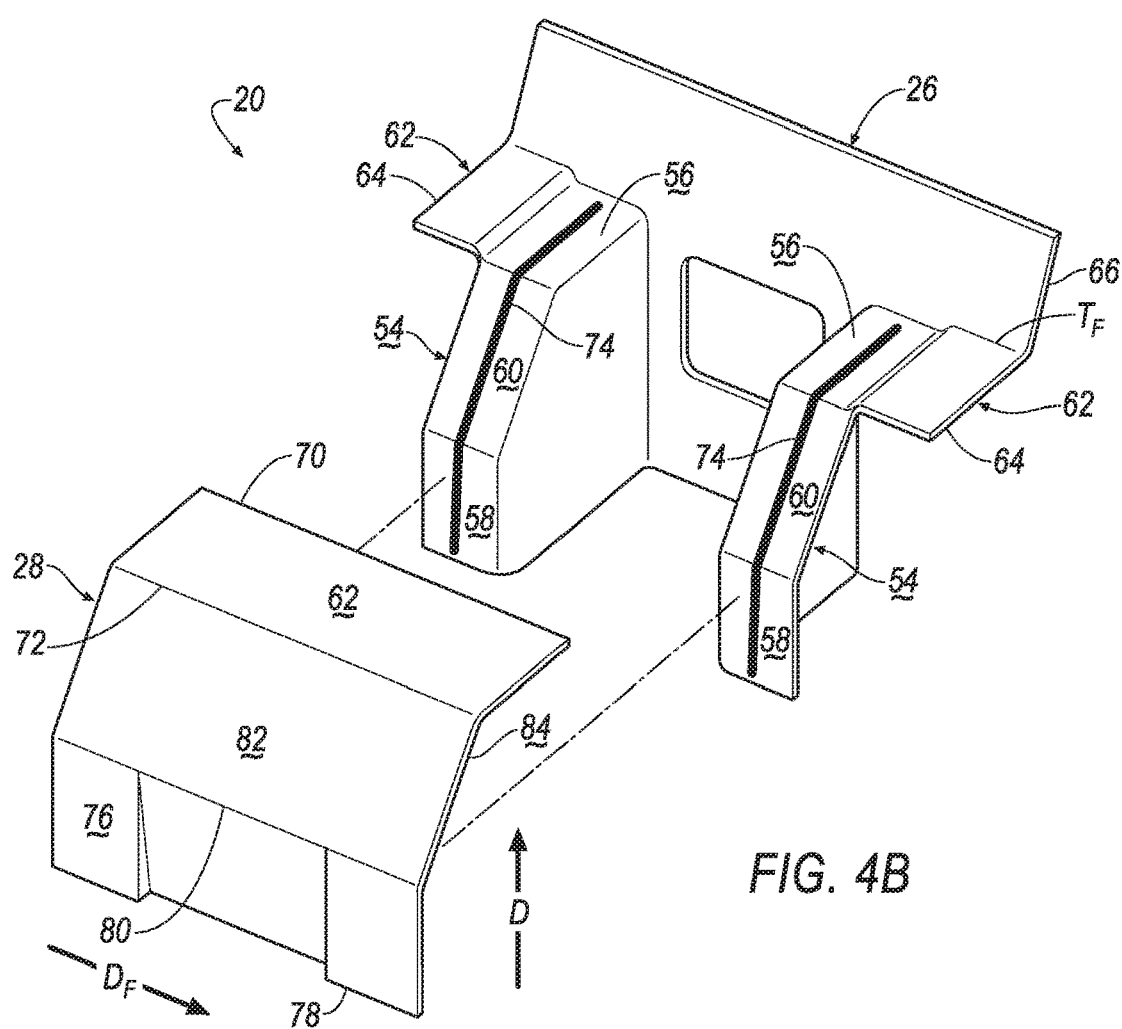
FIG. 4B is an exploded view of the bracket assembly in FIG. 4A.

The bracket outer 28 may include a surface 68 extending in the vehicle fore-and-aft direction Df from one wing 62 to the other wing 62 of the bracket inner 26, as shown in FIG. 4B. The surface 68 may abut the bottom 24 of the roof rail 18. In other words, the surface 68 and the wings 62 may extend in a plane P along the bottom 24 of the roof rail 18. As an example, the plane P may be horizontal. The surface 68 may be elongated in the vehicle fore-and-aft direction Df. A space between the surface 68 and each of the wings 62 may be beneath the bottom 24 of the roof rail 18, e.g., in a vertical direction, to reduce the likelihood of exposure to water and/or hide the space from sight. The bracket outer 28 may be formed of any suitable material, e.g., mild steel, boron, etc.

The surface 68 may include an inner edge 70 and an outer edge 72 spaced from the inner edge 70 in the cross-vehicle direction Dc, as shown in FIG. 4A. The inner edge 70 of the surface 68 may be adjacent to the inner side 50 of the roof rail 18, and the outer edge 72 of the surface 68 may be adjacent to the outer side 52 of the roof rail 18, as shown in FIG. 2. In other words, the surface 68 may extend in the cross-vehicle direction Dc from the inner side 50 to the outer side 52 of the roof rail 18, i.e., across the bottom 24 of the roof rail 18 in the cross-vehicle direction Dc. A space between the inner edge 70 and the bracket inner 26, e.g., the flange 66, may be beneath the bottom 24 of the roof rail 18, e.g., in a vertical direction, to reduce the likelihood of exposure to water and/or hide the space from sight. The inner edge 70 of the surface 68 may be disposed adjacent to the flange 66 of the bracket inner 26. For example, the inner edge 70 of the surface 68 may abut the flange 66 of the bracket inner 26. The surface 68 is fixed, e.g., welded and/or adhered, etc., to the bottom 24 of the roof rail 18.

A sealant 74 may be sandwiched between the outer edge 72 of the surface 68 and the bottom 24 of the roof rail 18, e.g., the transition Tr from the bottom 24 of the roof rail 18 to the outer side 52 of the roof rail 18. The sealant 74 may prevent water and debris from entering between the surface 68 and the bottom 24 of the roof rail 18 when the vehicle 10 is in operation, e.g., when the exterior panel 16 is in the uncovered position. The sealant 74 may be disposed along the outer edge 72 of the surface 68 from one wing 62 to the other wing 62, i.e., along the entire length of the surface 68. The sealant 74 may be any suitable weldable material, e.g., acrylic, epoxy, polyurethane, rubber based butyl, etc. Alternatively, the sealant 74 may be any suitable structural adhesive, e.g., urethane, two-part epoxy, etc.

With reference to FIG. 4A, the bracket outer 28 may include an outer surface 76 elongated in the vehicle fore-and-aft direction Df and extending in the direction D. The outer surface 76 may include a bottom edge 78 spaced from the surface 68 in the direction D. The outer surface 76 may include a top edge 80 spaced from the bottom edge 78 in the direction D. The top edge 80 may be spaced from the surface 68. In this situation, the bracket outer 28 may include an intermediate surface 82 extending from the outer surface 76 to the surface 68. In this situation, the intermediate surface 82 may extend transverse, e.g. at a non-right angle, to both the cross-vehicle direction Dc and the direction D. Alternatively, the top edge 80 may abut the surface 68. In this situation the outer surface 76 may extend downwardly from the surface 68 to the bottom edge 78.

With continued reference to FIG. 4A, each of the surface 68, the intermediate surface 82, and the outer surface 76 may face away from the passenger cabin 40. The bracket outer 28 may include an inner surface 84 extending along the bracket outer 28 from the inner edge 70 of the surface 68 to the bottom edge 78 of the outer surface 76. The inner surface 84 may face the opposite direction as the surface 68, the intermediate surface 82, and the outer surface 76. In other words, the inner surface 84 may face toward the passenger cabin 40, i.e., the bracket inner 26. The inner surface 84 of the bracket outer 28 extends along the sealing surfaces 54 of the bracket inner 26, e.g., from the surface 68 to the front surface. The inner surface 84 of the bracket outer 28 may be fixed to the sealing surfaces 54 of the bracket inner 26, e.g., from the top surfaces 56 to the front surface.

With continued reference to FIG. 4A, the sealant 74 may be sandwiched between the bracket inner 26, and the bracket outer 28. For example, the sealant 74 may be sandwiched between the sealing surfaces 54 of the bracket inner 26 and the inner surface 84 of the bracket outer 28. The sealant 74 may, for example, be disposed entirely along the sealing surfaces 54, e.g., from the top surfaces 56 to the front surface.

The pillar inner 30 may be disposed between the pillar outer 32 and the passenger cabin 40, as shown in FIG. 3. In other words, the pillar inner 30 may face the passenger cabin 40. The pillar inner 30 may be elongated in the direction D. The pillar inner 30 may, for example, extend from the floor 46 to the roof rail 18 of the vehicle 10. As another example, the pillar inner 30 may extend from the floor 46 to the bracket inner 26, i.e., the pillar inner 30 may be spaced from the roof rail 18. The pillar inner 30 may be formed of any suitable material, e.g., mild steel, boron, etc.

With reference to FIG. 3, the pillar inner 30 includes walls 86 spaced from each other in the vehicle fore-and-aft direction Df and a back 88 extending from one wall 86 to the other wall 86. The walls 86 and the back 88 define a channel 90 elongated in the direction D. The channel 90 may be sized to receive the bracket inner 26. For example, the bracket inner 26 may be disposed in the channel 90 and abut the walls 86 and the back 88 of the pillar inner 30. In other words, the channel 90 may cover the bracket inner 26. The bracket inner 26 may be fixed, e.g., welded and/or adhered, etc., to the pillar inner 30 in the channel 90.

With continued reference to FIG. 3, the walls 86 may include weld flanges 92 extending away from each other in the vehicle fore-and-aft direction Df. In other words, the weld flanges 92 may each extend away from the channel 90. The weld flanges 92 may be elongated in the direction D. For example, the weld flanges 92 may extend entirely along the pillar inner 30 in the direction D.

The pillar outer 32 may face away from the passenger cabin 40 of the vehicle 10. The pillar outer 32 may be elongated in the direction D, as shown in FIG. 3. The pillar outer 32 may, for example, extend from the roof rail 18 to the floor 46 of the vehicle 10. As another example, the pillar outer 32 may extend from the floor 46 to the bracket outer 28, i.e., the pillar outer 32 may be spaced from the roof rail 18. The pillar outer 32 may extend across the bracket outer 28 in the vehicle fore-and-aft direction Df. In other words, the pillar outer 32 may cover the bracket outer 28 in the vehicle fore-and-aft direction Df. The pillar outer 32 may be formed of any suitable material, e.g., mild steel, boron, etc.

With reference to FIG. 3, the pillar outer 32 may include mounting flanges 94 spaced from each other in the vehicle fore-and-aft direction Df. The mounting flanges 94 may abut the weld flanges 92 of the pillar inner 30. Specifically, the mounting flanges 94 may be fixed, e.g., welded and/or adhered, etc., to the weld flanges 92 of the pillar inner 30. The mounting flanges 94 may be elongated in the direction D. For example, the weld flanges 92 may extend entirely along the pillar outer 32 in the direction D.

With continued reference to FIG. 3, the pillar outer 32 may include an inside surface 96 facing the passenger cabin 40, i.e., the bracket outer 28. The inside surface 96 of the pillar outer 32 may abut the bracket outer 28, e.g., the intermediate surface 82 and/or the outer surface 76. The inside surface 96 of the pillar outer 32 may be fixed, e.g., welded and/or adhered, etc., to the bracket outer 28, e.g., the intermediate surface 82 and/or the outer surface 76.

The sealant 74 may be sandwiched between the pillar inner 30 and the pillar outer 32. For example, the sealant 74 may be sandwiched between the weld flanges 92 of the pillar inner 30 and the mounting flanges 94 of the pillar outer 32. The sealant 74 may, for example, be disposed entirely along the weld flanges 92 and mounting flanges 94, e.g., in the direction D.

With reference to FIG. 3, the pillar 22 may include a body side panel 98 encompassing the pillar outer 32. In other words, the body side panel 98 may extend from one mounting flanges 94 to the other mounting flange. The body side panel 98 may, for example, cover the pillar outer 32 and the bracket outer 28. In other words, the body side panel 98 may extend to the roof rail 18. The body side panel 98 may abut the mounting flanges 94 of the pillar outer 32. In other words, the mounting flanges 94 of the pillar outer 32 may be sandwiched between the body side panel 98 and the weld flanges 92 of the pillar inner 30. In this situation, the body side panel 98 may be fixed, e.g., welded and/or adhered, etc., to the pillar outer 32, i.e., the mounting flanges 94, and the pillar inner 30, i.e., the weld flanges 92. Additionally, the body side panel 98 may abut the intermediate surface 82 of the bracket outer 28. The body side panel 98 may be fixed, e.g., welded and/or adhered, etc., to the intermediate surface 82 of the bracket outer 28.

The body side panel 98 may be elongated from the roof rail 18 toward the floor 46 any suitable amount. For example, the body side panel 98 may extend from the roof rail 18 to the floor 46 of the vehicle 10. In this situation, the body side panel 98 may be formed of any suitable material, e.g., mild steel. As another example, the body side panel 98 may extend from the roof rail 18 to a position spaced from the floor 46, e.g., the top of a vehicle door, as shown in FIG. 2. In this situation, the body side panel 98 may be an applique. In other words, the body side panel 98 may be formed of a different material than the pillar outer 32, e.g., plastic, nylon, etc.

With reference to FIG. 1B, the roof frame 14 may include a plurality of cross members 100 extending from one roof rail 18 to the other roof rail 18. The cross members 100 may, for example, extend from the pillar 22 on one side 34 of the vehicle 10 to the pillar 22 on the other side 36 of the vehicle 10. The cross members 100 may be spaced from each other in the vehicle fore-and-aft direction Df. The roof frame 14 may include any suitable number of cross members 100. The cross members 100 may be fixed to the roof rails 18 in any suitable manner, e.g., welded, adhered, and/or fasteners, etc.

With reference to FIG. 1A, in the covered position, the exterior panel 16 is connected to the roof frame 14. In this situation, the exterior panel 16 may cover the roof frame 14, i.e., the passenger cabin 40. In other words, the exterior panel 16 may extend along the roof frame 14 from the front fender 42 to the rear fender 44 and may extend across the roof from one side 34 to the other side 36. The exterior panel 16 may be releasably connected to any suitable component of the roof frame 14, e.g., the roof rails 18, the cross members 100, etc. The exterior panel 16 may be releasably connected to the roof frame 14 in any suitable fashion, e.g., clamps, latches, screws, bolts, etc.

In the uncovered position, the exterior panel 16 is released from the roof frame 14, i.e., spaced from the roof frame 14. In this situation, the exterior panel 16 may, for example, be stored in the vehicle 10, e.g., a cargo compartment. Alternatively, the exterior panel 16 may be stored in a location separate from the vehicle 10. When the exterior panel 16 is in the uncovered position, the roof frame 14 is exposed to the environment, e.g., sunlight, wind, water, debris, etc. In other words, the passenger cabin 40 is exposed to the environment, as shown in FIG. 1B.

The exterior panel 16 may be formed of any suitable type of material. For example, the exterior panel 16 may be formed of steel. Alternatively, the exterior panel 16 may be formed of aluminum, fiberglass, carbon fiber, or any other suitable type of material.

The exterior panel 16 may be a single continuous unit, e.g., a single piece. Alternatively, the exterior panel 16 may include a plurality of segments, i.e., two or more, releasably connected to each other. The segments may be releasably connected to each other in any suitable fashion, e.g., clamps, latches, screws, bolts, etc.

In general, as described in more detail below in an exemplary process, the roof frame 14 is assembled to prevent water and debris from entering the pillar 22 when the exterior panel 16 is in the uncovered position. The shape of the bracket outer 28 and the bracket inner 26 reduce weld lines visible from the exterior of the vehicle 10 and reduce the size or number of intrusions between the bracket assembly 20 and the roof rail 18.

The process begins by welding the bracket outer 28 to the bottom 24 of the roof rail 18. Specifically, the surface 68 is welded to the bottom 24 of the roof rail 18. When the bracket outer 28 is welded to the bottom 24 of the roof rail 18, sealant 74 may be disposed between the outer edge 72 of the surface 68 and the transition Tr between the outer side 52 and the bottom 24 of the roof rail 18.

Next, the sealant 74 is disposed along the sealing surfaces 54 of the bracket inner 26, as set forth above. The bracket inner 26 is positioned such that the bracket outer 28, i.e., the surface 68, extends from one wing 62 to the other wing 62. Additionally, the inner surface 84 of the bracket outer 28 is adjacent to the sealing surfaces 54 of the bracket inner 26. The sealant 74 is sandwiched between the inner surface 84 of the bracket outer 28 and the sealing surfaces 54 of the bracket inner 26.

Next, the bracket inner 26 is welded to the bracket outer 28 and the roof rail 18. Specifically, the wings 62 of the bracket inner 26 are welded to the bottom 24 of the roof rail 18, and the flange 66 of the bracket inner 26 is welded to the inner side 50 of the roof rail 18. Additionally, the sealing surfaces 54 of the bracket inner 26 are welded to the inner surface 84 of the bracket inner 26.

Next, the pillar inner 30 is positioned around the bracket inner 26 such that the bracket inner 26 is disposed in the channel 90 of the pillar inner 30. The sealant 74 may be disposed in the channel 90 such that the sealant 74 is sandwiched between the channel 90 and the bracket inner 26. The pillar inner 30, i.e., the channel 90, is welded to the bracket inner 26.

Next, the sealant 74 may be disposed along the weld flanges 92 of the pillar inner 30. The pillar outer 32 is positioned such that the mounting flanges 94 abut the weld flanges 92. In other words, the pillar outer 32 extends across the bracket outer 28. For example, the inside surface 96 of the pillar outer 32 abuts the intermediate surface 82 and the outer surface 76 of the bracket outer 28. The pillar outer 32 is welded to the bracket outer 28, i.e., the intermediate surface 82.

Next, the body side panel 98 is positioned such that the body side panel 98 abuts the mounting flanges 94 and the bottom 24 of the roof rail 18. The sealant 74 may be disposed along the mounting flanges 94. In other words, the sealant 74 may be sandwiched between the body side panel 98 and the mounting flanges 94. Additionally, the body side panel 98 abuts the bracket outer 28, e.g., the intermediate surface 82, and the pillar outer 32.

Next, the body side panel 98 is welded to the intermediate surface 82 of the bracket outer 28. Additionally, the body side panel 98 is welded to the pillar outer 32, i.e., the mounting flanges 94, and the pillar inner 30, i.e., the weld flanges 92. In other words, the body side panel 98, the mounting flanges 94 of the pillar outer 32, and the weld flanges 92 of the pillar inner 30 are welded together.

When the exterior panel 16 is in the covered position, the exterior panel 16 shields the roof frame 14 from the environment, e.g., water, debris, etc. When the exterior panel 16 is in the uncovered position, the roof frame 14 is exposed to the environment, e.g., water, debris, etc. The bracket assembly 20 is designed to match the contour, i.e., curvature, of the roof rail 18 to prevent water intrusion into the pillar 22. Additionally, the design of the bracket assembly 20 reduces the visible weld lines when an occupant views the vehicle 10 from the side outside the passenger cabin 40. In other words, the bracket is designed such that weld lines are disposed on the inner side 50 of the roof rail 18, i.e., facing the passenger cabin 40. By reducing water intrusion into the pillar 22, the bracket assembly 20 assists in preventing or reducing corrosion of the pillar 22 and other vehicle components, e.g., the rockers.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A roof frame comprising:
a roof rail including a bottom;
a bracket assembly including a bracket inner and a bracket outer fixed to each other, the bracket inner and the bracket outer fixed to the bottom of the roof rail; and
a pillar including a pillar inner fixed to the bracket inner and a pillar outer fixed to the bracket outer, the pillar inner and the pillar outer fixed to each other.

2. The roof frame of claim 1, wherein the bracket outer includes a surface extending in a vehicle fore-and-aft direction, the surface being fixed to the bottom of the roof rail.

3. The roof frame of claim 1, wherein the roof rail includes an inner side and an outer side spaced from each other in a cross-vehicle direction, the inner side and the outer side extending from the bottom in a direction transverse to the cross-vehicle direction.

4. The roof frame of claim 3, wherein the bracket inner includes a flange extending in the direction along the inner side of the roof rail, the flange being fixed to the inner side of the roof rail.

5. The roof frame of claim 1, wherein the bracket inner includes wings spaced from each other in a vehicle fore-and-aft direction, the wings being fixed to the bottom of the roof rail.

6. The roof frame of claim 5, wherein the bracket outer includes a surface extending in the vehicle fore-and-aft direction from one wing to the other wing, the surface and the wings extend in a plane along the bottom of the roof rail.

7. The roof frame of claim 6, wherein the bracket inner includes a flange elongated in the vehicle fore-and-aft direction, the surface includes an inner edge abutting the flange from one wing to the other wing.

8. The roof frame of claim 7, wherein the surface includes an outer edge spaced from the inner edge in a cross-vehicle direction, and further comprising a seal sandwiched between the outer edge of the surface and the bottom of the roof rail, the seal extending from one wing to the other wing.

9. The roof frame of claim 1, wherein the bracket assembly includes a seal sandwiched between the bracket inner and the bracket outer.

10. The roof frame of claim 9, wherein the bracket inner includes sealing surfaces spaced from each other in a vehicle fore-and-aft direction, each sealing surface including a top surface extending in a cross-vehicle direction and a front surface extending in a direction transverse to the cross-vehicle direction.

11. The roof frame of claim 10, wherein the bracket outer includes an inner surface abutting the sealing surfaces, the inner surface extending along each sealing surface from the top surface to the front surface.

12. The roof frame of claim 10, wherein the seal is disposed along each sealing surface from the top surface to the front surface.

13. The roof frame of claim 12, wherein each sealing surface includes a transition surface extending from the top surface to the front surface, the seal disposed along the transition surface.

14. The roof frame of claim 1, wherein the pillar inner includes walls spaced from each other in a vehicle fore-andaft direction and a back extending from one wall to the other wall, the walls and the back defining a channel and the bracket inner disposed in the channel.

15. The roof frame of claim 14, wherein the bracket inner abuts the walls and the back of the pillar inner, the bracket inner being fixed to the pillar inner in the channel.

16. The roof frame of claim 14, wherein the pillar inner includes a weld flange extending from each wall away from the channel in the vehicle fore-and-aft direction, and the pillar outer includes mounting flanges spaced from each other in the vehicle fore-and-aft direction, the mounting flanges of the pillar outer abutting the weld flanges of the pillar inner, respectively.

17. The roof frame of claim 16, wherein a seal is sandwiched between the mounting flanges of the pillar outer and the weld flanges of the pillar inner.

18. The roof frame of claim 16, wherein the pillar includes a body side encompassing the pillar outer, the mounting flanges of the pillar outer being sandwiched between the body side and the weld flanges of the pillar inner.

19. The roof frame of claim 1, wherein the pillar includes a body side encompassing the pillar outer and the bracket outer, the body side fixed to the pillar outer and the bracket outer.

20. The roof frame of claim 19, wherein the body side is fixed to the pillar inner.

* * * * *